June 24, 1941. E. D. DALL 2,246,788
HINGED BUMPER GUARD
Filed Aug. 17, 1940 2 Sheets-Sheet 1
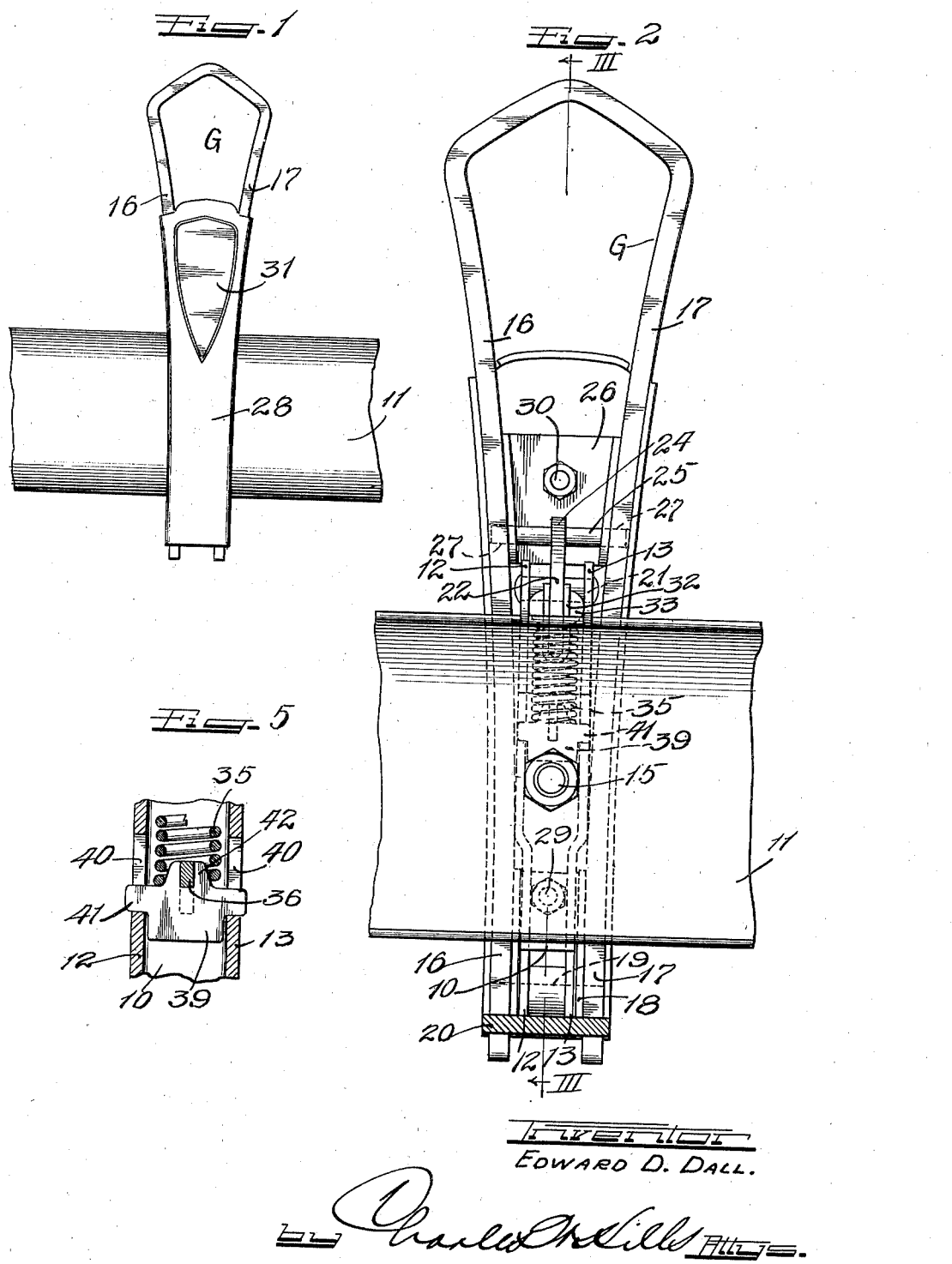
Inventor
EDWARD D. DALL.

June 24, 1941.  E. D. DALL  2,246,788
HINGED BUMPER GUARD
Filed Aug. 17, 1940  2 Sheets-Sheet 2
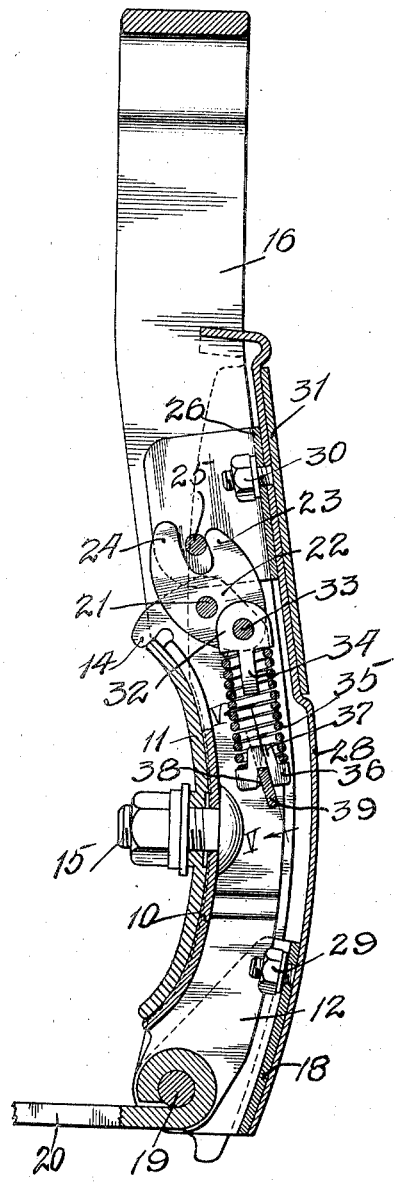
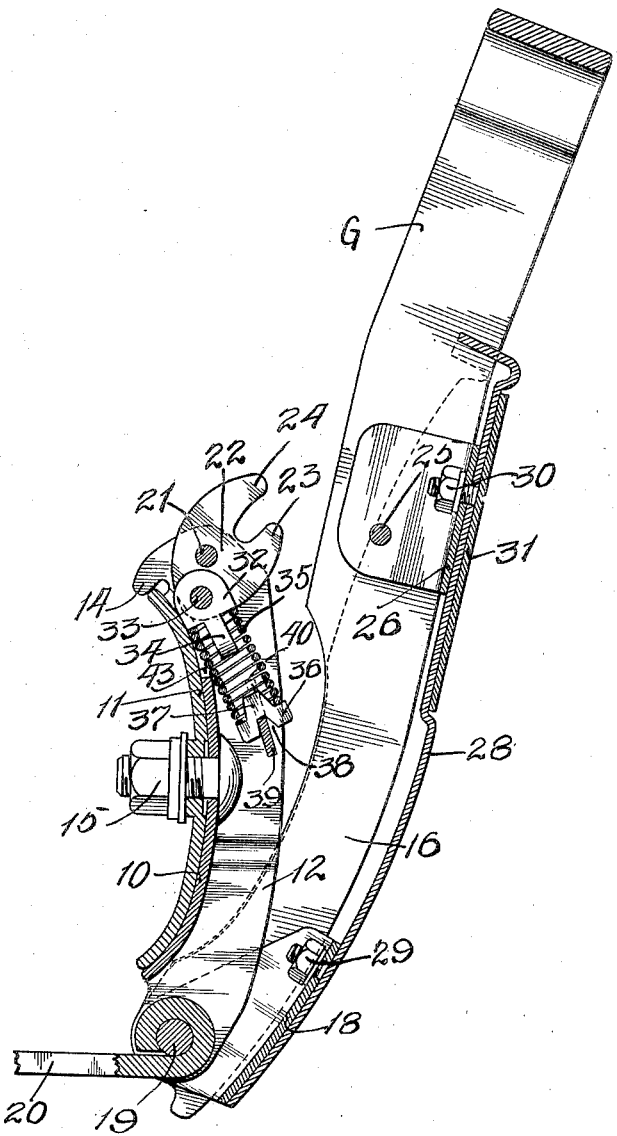
Inventor
EDWARD D. DALL.

Patented June 24, 1941

2,246,788

UNITED STATES PATENT OFFICE 2,246,788

HINGED BUMPER GUARD

Edward D. Dall, Detroit, Mich., assignor to Houdaille-Hershey Corporation, Detroit, Mich., a corporation of Michigan Application August 17, 1940, Serial No. 353,006

4 Claims. (Cl. 293—55)

My invention relates to automobile bumper guard structure and particularly to the type of guard structure in which the guard body may be swung away from the bumper bar to permit access to automobile parts such as, for example, to permit opening of the door of the baggage compartment at the rear of the automobile.

The object of my invention is to provide for the hinged guard body improved latching means in the form of a rocking latch engageable by a keeper element on the guard body to be rocked into interlatching engagement therewith when the body is swung into its service position, with a cross center spring engaging the rocking latch bolt to snap it quickly into latching or unlatching position and to exert pressure thereagainst for urging the guard body into secure engagement with its supporting bracket and for holding it against displacement or rattle.

The features of my invention are incorporated in the structure shown on the drawings, in which drawings:

Figure 1 is a front elevation of the guard structure mounted on a bumper impact bar;

Figure 2 is an enlarged rear elevation of the guard structure on the bumper bar;

Figure 3 is a section on plane III—III Figure 2 showing the guard structure in service position;

Figure 4 is a view similar to Figure 3 showing the guard body released for downward swing, and Figure 5 is an enlarged section on plane V—V Figure 3.

The guard structure shown comprises a supporting bracket of U-shape cross section whose web or back wall 10 is shaped to receive and fit against the outer face of a bumper impact bar 11, the side walls 12 and 13 of the bracket having the hook shaped extensions 14 at their upper ends for engagement against the upper edge of the bumper impact bar. Securing means such as a bolt 15 extends through the bracket back wall 10 and the impact bar to secure the bracket securely in place.

The guard body comprises the main guard structure G which, as shown, is of inverted U-shape or hairpin shape and may be formed from a length of flat stock bar. Between the lower ends of the legs 16 and 17 of the guard element G is inserted a U-shaped bracket 18 between whose side walls extend the lower ends of the side walls 12 and 13 of the supporting bracket 10, a hinge pin 19 extending through the aligned walls so that the structure G is hinged on the supporting bracket 10 for swing in a vertical plane. A strengthening and supporting bar 20 may extend from the vehicle body and form at its outer end a flange eye for receiving the hinge pin between the side walls 12 and 13 of the supporting bracket 10.

Extending between and secured to the side walls 12 and 13 of the supporting bracket 10 and at the upper ends thereof is a pin 21 on which is mounted the rocking latch bolt 22 having the upwardly extending latching arm 23 and the setting arm 24. Cooperable with the latch bolt arm is a keeper bar 25 supported by the side walls of a U-shaped bracket 26 situated between the legs 16 and 17 of the guard element G, the keeper rod 25 extending at its ends into openings 27 in the guard legs, as clearly shown on Figure 2, so that the keeper structure will be securely held in proper position.

A cover or housing structure 28 of U-shape cross section has its side walls engaging against the outer sides of the legs 16 and 17 of the guard member G, this housing being secured as by bolt structures 29 and 30 to the brackets 18 and 26 respectively. The head 31 for the upper bolt 30 which secures the bracket 26 may be in the form of an escutcheon or name plate. The sides of the housing 28 at their lower ends cover the end of the hinge pin 19 so as to prevent escape or removal of this hinge pin from the guard structure, and the side walls of the housing also extend over the outer ends of the openings 27 in the guard legs so as to prevent removal of the keeper bar or pin 25.

The lower end of the latch bolt 22 is received between the side walls of a yoke member 32, a pin or rivet 33 pivoting the yoke to the bolt. The reduced lower end 34 of the yoke member receives and aligns the upper end of a compression spring 35 which abuts against the yoke body. At its lower end the spring abuts a toggle plate 36 having the upwardly extending guide projections 37 within the spring, the plate in its lower end having a seating notch 38 for straddling and seating against the seating plate 39 extending between the side walls 12 and 13 of the guard supporting bracket 10, these side walls having slots 40 for receiving the arms 41 on the seating plate, these arms seating against the lower ends of the slots. Upwardly extending arms 42 on the seating plate 39 receive between them the extension 37 on the toggle plate 36 and assist the extension 37 in holding the lower end of the spring properly aligned.

The spring 35 constantly exerts upward pressure against the yoke pin 33, the pin 33, during swing of the latch bolt to its latching or unlatching position, passing through the spring pressure center line extending through the latch bolt fulcrum 21 and the spring seat 39 so that after a preliminary movement of the latch bolt to either latching or unlatching position, as soon as the pin 33 passes through the spring center line of pressure the force of the spring will quickly move or snap the latch bolt fully to its latching or unlatching position.

Figure 3 shows the guard structure G in its latched or service position in which it extends vertically upwardly from the bumper impact bar 11. The spring pressure line against the pin 33 is to the right of the latch bolt fulcrum pin 21 so that the force of the spring tends to force the latching arm 23 of the latch bolt against the keeper pin 25 so as to hold the guard structure G securely against its supporting bracket 10 and to prevent rattling thereof. If it is desired to swing the guard element G for access to some part of the vehicle, as for example, the trunk cover at the rear of the vehicle, all that is necessary is to exert pressure against the guard element G to swing it away from the bumper bar, such pressure against the guard element G being transmitted by the keeper bar 25 to the latching arm 23 of the latch bolt so that this latch bolt will be rocked outwardly (clockwise) for release of the keeper bar for freeing of the guard element G for downward swing. As the latch bolt is rocked for release of the guard, the yoke pin 33 will be moved through the center line of pressure of the spring 35 and then the spring will quickly rock the latch bolt into its full unlatching position shown on Figure 4, this movement being limited by the engagement of the yoke 32 with the impact bar, the back wall of the bracket 10 being cut away in its upper end as indicated at 43 to provide clearance for the yoke and spring.

For resetting of the guard element G back to its service position, all that is necessary is to swing it up to bring the keeper bar 25 against the setting arm 24 of the latch bolt and as the latch bolt is rocked (counter-clockwise) the latching arm 23 thereof will be brought in behind the keeper bar 25, and as soon as the pin 33 passes through the spring pressure center line, the force of the spring 35 will quickly move the latch bolt back to its latching position shown on Figure 3 and the spring pressure will hold the guard securely in service position.

I thus provide simple and efficient latching means for automatically securely latching a guard element in service position on a bumper bar, no manual actuation of latch parts being required for unlatching, the latching and unlatching being accomplished entirely automatically by the swing of the guard element into service position or away from service position.

I have shown a practical and efficient embodiment of the invention but I do not desire to be limited to the exact construction, arrangement and operation shown and described as changes and modifications may be made without departing from the scope of the invention.

I claim as follows:

1. A guard structure for an automobile bumper comprising a supporting bracket attachable to the impact bar of a bumper, a guard element hinged at its lower end to the bracket for swing thereon in a vertical plane, a keeper on the guard element, a rocking latch bolt on said supporting bracket having a latching arm and a setting arm whereby upon swing of said guard element toward service position said keeper will engage with said latch bolt setting arm to rock said latch bolt for interlatching engagement of its latching arm with said keeper, and spring pressure means acting against said latch bolt for yieldably holding it in interlatching engagement with said keeper.

2. A guard structure for an automobile bumper comprising a supporting bracket attachable to a bumper impact bar, a guard element hinged at its lower end to said bracket for upward swing into service position or for downward swing from service position, a keeper on said guard element, a rocking latching bolt on said bracket having a setting arm and a latching arm, said keeper upon swing of said guard element into service position engaging with said latch bolt setting arm for rotation of said latch bolt and interlatching engagement of its latching arm with said keeper, a cross center spring on said bracket adapted to effect final movement of said latch bolt to either its latching or unlatching position whereby to releasably lock said latch bolt in its latching position for holding of said guard element in service position.

3. A guard structure for automobile bumpers comprising a supporting bracket member adapted to be secured to an automobile bumper, a guard member hinged to the lower end of the bracket member for swing into service position or away from service position, a latch bolt keeper on one of said members, a locking latch bolt fulcrumed intermediate its ends on the other of said members and having at its outer end a latching arm and an adjacent setting arm, yielding means tending to hold said latch bolt in its latching or unlatching position, said setting arm when said latch bolt is in its unlatching position being engageable by the keeper when said guard member is swung to service position whereby said bolt will be rocked to bring its latching arm into latching engagement with said keeper.

4. A guard structure for automobile bumpers comprising a supporting bracket attached to the impact bar of a bumper, a guard element hinged at its lower end to said bracket for swing thereon into service position or away from service position, a keeper on said guard element, a latch bolt fulcrumed intermediate its ends on said bracket and having at its upper end a latching arm and an adjacent setting arm, a crossover spring on said bracket engaging the lower end of said bolt for yieldably holding said bolt either in latching or unlatching position, said setting arm when said bolt is in unlatching position being engageable by the keeper when said guard element is swung toward service position whereby said bolt will be rocked toward its latching position for latching engagement of its latching arm with the keeper.

EDWARD D. DALL.